United States Patent
Ko et al.

(10) Patent No.: US 12,231,337 B2
(45) Date of Patent: *Feb. 18, 2025

(54) ROUTE OPTIMIZATION USING STAR-MESH HYBRID TOPOLOGY IN LOCALIZED DENSE AD-HOC NETWORKS

(71) Applicant: DIGITAL LUMENS INCORPORATED, Boston, MA (US)

(72) Inventors: David Ko, East York (CA); Liam O'Hagan, Walkerton (CA); Stefan Warner, Markham (CA); Leo Tolisano, North York (CA)

(73) Assignee: DIGITAL LUMENS INCORPORATED, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,237

(22) Filed: Feb. 6, 2023

(65) Prior Publication Data
US 2023/0188466 A1    Jun. 15, 2023

Related U.S. Application Data

(63) Continuation of application No. 17/209,135, filed on Mar. 22, 2021, now Pat. No. 11,575,603, which is a
(Continued)

(51) Int. Cl.
*H04L 45/745* (2022.01)
*H04L 45/122* (2022.01)
(Continued)

(52) U.S. Cl.
CPC .......... *H04L 45/745* (2013.01); *H04L 45/122* (2013.01); *H04W 4/80* (2018.02); *H04W 84/18* (2013.01)

(58) Field of Classification Search
CPC ..... H04L 45/745; H04L 45/122; H04L 43/10; H04W 4/008
See application file for complete search history.

(56) References Cited

U.S. PATENT DOCUMENTS

| 5,521,852 A | 5/1996 | Hibbs et al. |
| 5,521,853 A | 5/1996 | Hibbs et al. |

(Continued)

FOREIGN PATENT DOCUMENTS

WO    2012/129243 A1    9/2012

OTHER PUBLICATIONS

Office Action in Canadian Patent Application No. 2922449, mailed Feb. 23, 2023.
(Continued)

*Primary Examiner* — Redentor Pasia
(74) *Attorney, Agent, or Firm* — McDermott Will & Emery LLP

(57) ABSTRACT

Optimized routing in localized dense networks is provided. A packet is received at a first network device in a network. An optimal route for the packet to a neighbor network device in the network is determined using a Source Routing Table (SRT), wherein the SRT includes an optimized routing table and a standard routing table, and wherein the optimized routing table comprises a list of neighbor network devices that the first network device can route to directly and wherein the standard routing table comprises a ZigBee source routing table. The packet is routed using the optimal route.

15 Claims, 6 Drawing Sheets

Related U.S. Application Data continuation of application No. 16/297,442, filed on Mar. 8, 2019, now Pat. No. 10,958,577, which is a continuation of application No. 15/058,192, filed on Mar. 2, 2016, now Pat. No. 10,230,634.

(60) Provisional application No. 62/232,699, filed on Sep. 25, 2015.

(51) Int. Cl.
*H04W 4/80* (2018.01)
*H04W 84/18* (2009.01)

(56) References Cited

U.S. PATENT DOCUMENTS

| | | | |
|---|---|---|---|
| 5,640,792 A | 6/1997 | Smith et al. | |
| 5,739,639 A | 4/1998 | Johnson | |
| 5,895,986 A | 4/1999 | Walters et al. | |
| 6,028,396 A | 2/2000 | Morrissey, Jr. et al. | |
| 6,035,266 A | 3/2000 | Williams et al. | |
| 6,359,555 B1 | 3/2002 | Williams | |
| 6,370,489 B1 | 4/2002 | Williams et al. | |
| 6,384,722 B1 | 5/2002 | Williams | |
| 6,393,381 B1 | 5/2002 | Williams et al. | |
| 6,415,245 B2 | 7/2002 | Williams et al. | |
| 6,452,339 B1 | 9/2002 | Morrissey et al. | |
| 6,452,340 B1 | 9/2002 | Morrissey et al. | |
| 6,456,960 B1 | 9/2002 | Williams et al. | |
| 6,604,062 B2 | 8/2003 | Williams et al. | |
| 6,714,895 B2 | 3/2004 | Williams et al. | |
| 6,807,516 B2 | 10/2004 | Williams et al. | |
| 6,841,944 B2 | 1/2005 | Morrissey et al. | |
| 6,892,168 B2 | 5/2005 | Williams et al. | |
| 7,256,556 B2 | 8/2007 | Lane et al. | |
| 7,333,903 B2 | 2/2008 | Walters et al. | |
| 7,379,981 B2 | 5/2008 | Elliott et al. | |
| 7,501,768 B2 | 3/2009 | Lane et al. | |
| 7,529,594 B2 | 5/2009 | Walters et al. | |
| 7,546,167 B2 | 6/2009 | Walters et al. | |
| 7,546,168 B2 | 6/2009 | Walters et al. | |
| 7,603,184 B2 | 10/2009 | Walters et al. | |
| 7,761,260 B2 | 7/2010 | Walters et al. | |
| 7,839,295 B2 | 11/2010 | Ries, II | |
| 7,911,359 B2 | 3/2011 | Walters et al. | |
| 7,957,277 B2 * | 6/2011 | Roy | H04L 45/00 370/406 |
| 8,010,319 B2 | 8/2011 | Walters et al. | |
| 8,138,690 B2 | 3/2012 | Chemel et al. | |
| 8,214,061 B2 | 7/2012 | Westrick, Jr. et al. | |
| 8,232,745 B2 | 7/2012 | Chemel et al. | |
| 8,237,581 B2 | 8/2012 | Ries, II | |
| 8,237,582 B2 | 8/2012 | Ries, II | |
| 8,242,927 B2 | 8/2012 | Ries, II | |
| 8,260,575 B2 | 9/2012 | Walters et al. | |
| 8,339,069 B2 | 12/2012 | Chemel et al. | |
| 8,373,362 B2 | 2/2013 | Chemel et al. | |
| 8,531,134 B2 | 9/2013 | Chemel et al. | |
| 8,536,802 B2 | 9/2013 | Chemel et al. | |
| 8,552,664 B2 | 10/2013 | Chemel et al. | |
| 8,593,135 B2 | 11/2013 | Chemel et al. | |
| 8,610,376 B2 | 12/2013 | Chemel et al. | |
| 8,700,749 B2 | 4/2014 | Elliott et al. | |
| 8,729,833 B2 | 5/2014 | Chemel et al. | |
| 8,754,589 B2 | 6/2014 | Chemel et al. | |
| 8,805,550 B2 | 8/2014 | Chemel et al. | |
| 8,823,277 B2 | 9/2014 | Chemel et al. | |
| 8,841,859 B2 | 9/2014 | Chemel et al. | |
| 8,855,019 B2 | 10/2014 | Elliott et al. | |
| 8,866,408 B2 | 10/2014 | Chemel et al. | |
| 8,954,170 B2 | 2/2015 | Chemel et al. | |
| 9,014,829 B2 | 4/2015 | Chemel et al. | |
| 9,072,133 B2 | 6/2015 | Chemel et al. | |
| 9,125,254 B2 | 9/2015 | Chemel et al. | |
| 9,210,066 B2 | 12/2015 | Liu et al. | |
| 9,241,392 B2 | 1/2016 | Chemel et al. | |
| 9,510,426 B2 | 11/2016 | Chemel et al. | |
| 9,680,745 B2 | 6/2017 | Roch et al. | |
| 9,712,423 B1 | 7/2017 | Amis et al. | |
| 9,730,078 B2 | 8/2017 | Nixon et al. | |
| 9,795,016 B2 | 10/2017 | Motley et al. | |
| 9,832,832 B2 | 11/2017 | Chemel et al. | |
| 9,913,195 B2 * | 3/2018 | Petersen | H04W 72/20 |
| 10,097,417 B2 | 10/2018 | Pietrowicz et al. | |
| 10,230,634 B2 * | 3/2019 | Ko | H04L 45/122 |
| 10,958,577 B2 * | 3/2021 | Ko | H04W 4/80 |
| 11,575,603 B2 * | 2/2023 | Ko | H04L 45/122 |
| 2003/0009730 A1 | 5/2003 | Gibler et al. | |
| 2007/0002194 A1 | 1/2007 | Williams et al. | |
| 2007/0032990 A1 | 2/2007 | Williams et al. | |
| 2007/0217196 A1 | 9/2007 | Shaner | |
| 2009/0003356 A1 * | 1/2009 | Vaswani | H04L 45/66 370/400 |
| 2010/0246480 A1 * | 9/2010 | Aggarwal | H04W 40/02 370/328 |
| 2010/0281163 A1 | 11/2010 | Shi et al. | |
| 2011/0149858 A1 | 6/2011 | Hwang et al. | |
| 2011/0279248 A1 | 11/2011 | Ogawa | |
| 2012/0143357 A1 | 6/2012 | Chemel et al. | |
| 2012/0163177 A1 * | 6/2012 | Vaswani | H04W 40/246 370/236 |
| 2012/0235579 A1 | 9/2012 | Chemel et al. | |
| 2013/0063042 A1 | 3/2013 | Bora et al. | |
| 2013/0169185 A1 | 7/2013 | Dai et al. | |
| 2014/0028199 A1 | 1/2014 | Chemel et al. | |
| 2014/0285090 A1 | 9/2014 | Chemel et al. | |
| 2014/0285095 A1 | 9/2014 | Chemel et al. | |
| 2014/0292208 A1 | 10/2014 | Chemel et al. | |
| 2014/0293605 A1 | 10/2014 | Chemel et al. | |
| 2014/0333222 A1 | 11/2014 | Chemel et al. | |
| 2014/0375206 A1 | 12/2014 | Holland et al. | |
| 2015/0008827 A1 | 1/2015 | Carrigan et al. | |
| 2015/0008828 A1 | 1/2015 | Carrigan et al. | |
| 2015/0061511 A1 | 3/2015 | Chemel et al. | |
| 2015/0184842 A1 | 7/2015 | Chemel et al. | |
| 2015/0249595 A1 | 9/2015 | Geiger | |
| 2015/0382275 A1 * | 12/2015 | Pragada | H04W 40/12 370/252 |
| 2016/0028675 A1 * | 1/2016 | Veillette | H04L 51/214 370/312 |
| 2016/0036764 A1 | 2/2016 | Dong et al. | |
| 2016/0050725 A1 | 2/2016 | Johnson et al. | |
| 2016/0088615 A1 | 3/2016 | Soyak et al. | |
| 2016/0360594 A1 | 12/2016 | Chemel et al. | |
| 2017/0013658 A1 | 1/2017 | Ta et al. | |
| 2017/0019970 A1 | 1/2017 | Chemel et al. | |
| 2017/0027045 A1 | 1/2017 | Chemel et al. | |
| 2017/0042001 A1 | 2/2017 | Chemel et al. | |
| 2017/0086279 A1 | 3/2017 | Chemel et al. | |
| 2017/0093687 A1 * | 3/2017 | Wu | H04L 45/12 |
| 2017/0272481 A1 | 9/2017 | Beckhardt et al. | |
| 2017/0289812 A1 | 10/2017 | Werb | |
| 2017/0311226 A1 * | 10/2017 | Fuhrmann | H04L 45/02 |
| 2018/0309593 A1 * | 10/2018 | Dong | H04L 45/04 |

OTHER PUBLICATIONS

Enlightened Energy Management System, ETCC Open Forum, 13 pp. (Jul. 24, 2012).
Office Action in U.S. Appl. No. 12/832,211, mailed Sep. 12, 2012, 4 pages.
Office Action in U.S. Appl. No. 12/832,211, mailed Jun. 20, 2013, 12 pages.
Office Action in U.S. Appl. No. 12/832,211, mailed Oct. 2, 2013, 13 pages.
Notice of Allowance in U.S. Appl. No. 12/832,211, mailed Apr. 23, 2014, 10 pages.
Office Action in U.S. Appl. No. 14/289,601, mailed Jan. 30, 2015, 6 pages.
Notice of Allowance in U.S. Appl. No. 14/289,601, mailed Apr. 1, 2015, 9 pages.
Notice of Allowance in U.S. Appl. No. 14/289,601, mailed Jun. 4, 2015, 2 pages.

(56) References Cited

OTHER PUBLICATIONS

Office Action in U.S. Appl. No. 14/518,831 mailed Dec. 30, 2016, 51 pp.
Notice of Allowance in U.S. Appl. No. 14/518,831, dated Aug. 21, 2017, 13 pages.
Vainio, A.-M. et al., Learning and adaptive fuzzy control system for smart home, Mar. 2008, http://www.springerlink.com/content/II72k32006I4qx81/fulltext.pdf, 10 pages.
ZigBee Alliance "Wireless Sensors and Control Networks: Enabling New Opportunities with ZigBee", Bob Heile, Chairman, ZigBee Alliance, Dec. 2006 Powerpoint Presentation, 53 pages.
ZigBee Alliance Document No. 08006r03, Jun. 2008, ZigBee— 200y Layer Pies and Stack Profile, Copyright 1;) 1996-2008 by the ZigBee Alliance. 2400 Camino Ramon, Suite 375, San Ramon, CA 94583, USA; http://www.zigbee.org, 119 pages.
ZigBee Specification Document 053474r17, Notice of Use and Disclosure; Jan. 17, 2008 11:09 A.M., Sponsored by: ZibEe Alliance; Copyright © 2007 ZigBee Standards Organizat. All rights reserved, (602 pages).

\* cited by examiner

ROUTE OPTIMIZATION USING STAR-MESH HYBRID TOPOLOGY IN LOCALIZED DENSE AD-HOC NETWORKS

CROSS-REFERENCE TO RELATED APPLICATION

The present application claims the benefit of, and priority of, U.S. patent application Ser. No. 17,209,135, filed Mar. 22, 2021 and entitled "ROUTE OPTIMIZATION USING STAR-MES HYBRID TOPOLOGY IN LOCALIZED DENSE AD-HOC NETWORKS", which claims the benefit of, and priority of, U.S. patent application Ser. No. 16/297,442, filed Mar. 8, 2019 and entitled "ROUTE OPTIMIZATION USING STAR-MES HYBRID TOPOLOGY IN LOCALIZED DENSE AD-HOC NETWORKS", now U.S. Pat. No. 10,958,577, which claims the benefit of, and priority of, U.S. patent application Ser. No. 15/058,192, filed Mar. 3, 2016 and entitled "ROUTE OPTIMIZATION USING STAR-MES HYBRID TOPOLOGY IN LOCALIZED DENSE AD-HOC NETWORKS", now U.S. Pat. No. 10,230,634, which claims the benefit to and priority to, U.S. Provisional Application No. 62/232,699, entitled "OPTIMIZED ROUTING IN LOCALIZED DENSE NETWORKS" and filed Sep. 25, 2015, the entire contents of all of which are hereby incorporated by reference.

TECHNICAL FIELD

The present invention relates to networks, and more specifically, to optimizing routing in localized mesh networks having a large number of network devices.

BACKGROUND

ZigBee is a low-cost, low-power, wireless mesh network standard targeted at the wide development of long battery life devices in wireless control and monitoring applications. ZigBee devices have low latency, which further reduces average current. ZigBee chips are typically integrated with radios and with microcontrollers that have some amount of memory, currently typically between 60-256 KB of flash memory. ZigBee operates in the industrial, scientific, and medical (ISM) radio bands. The ZigBee network layer natively supports generic mesh networking. Every network must have one coordinator device, tasked with its creation, the control of its parameters, and basic maintenance.

In a wireless mesh network, such as but not limited to a ZigBee wireless network, a message (or packet) is routed from one node to another node using intermediary nodes. This is normally done when the two end nodes are not in radio range of one another, but all of the intermediary nodes and the end nodes in the chain are in radio range of the previous and the next node in the chain. Each time the packet is forwarded to the next node in the chain, this is a hop. In theory, using meshing, any node may talk to any other node in the ZigBee network, but often all nodes will talk to just one node and that one node will talk back to them. In such a configuration, the one node through which all traffic flows is the concentrator, and ZigBee has special allowances for this type of configuration. In this configuration, communication may be made to be more efficient through a mechanism called source routing. Essentially, all the non-concentrator nodes just need to know how to route a packet hack to the concentrator. (In actuality, each node only knows the next node in the route to get back to the concentrator, and that next node knows its next node, and so on). The concentrator, however, needs to know the route to every single device on the network, and it needs to know the entire route. This puts most of the onus on the concentrator, which usually needs to be more intelligent and have more resources (memory, processing, communication, etc.) as a result.

The way the routes are formed in this configuration is that each node keeps track of its neighbors (devices within radio range) using its neighbor table and by listening to special types of messages called Link Status messages. These messages are not re-transmitted, so if a node hears one, it knows that it is in radio range of the device that sent the Link Status message. Periodically an MTORR (Many-to-One Route Request) packet or message is broadcast by the concentrator throughout the network. Devices build up their route back to the concentrator by using their neighbor tables and the propagation of the MTORR packet or message (routing cost back to the concentrator gets written to it by devices as it is re-broadcasted). Thus, Device A needs to be in Device B's neighbor table in order for Device A to route directly to Device B (and vice-versa).

SUMMARY

Conventional routing environments, such as those explained above, suffer from a variety of deficiencies. In ZigBee, there is a strict limitation of sixteen on the neighbor table size. This limits the number of direct hops to the concentrator, despite being in direct radio range. This is due to packet size limitations of the Link Status message. This normally is not a problem, except in a dense network where a device may have far more than sixteen neighbors. What may happen in this case, referring to FIG. 1, is that Device A may not be in Device B's neighbor table, even though it's within radio range, Device A may have to route through Device D, or even Device C and Device D, to get to Device B. Device A may be the concentrator (or even some node through which the concentrator may talk to B), meaning the concentrator may easily talk directly to Device B, but instead has to route through 2 other devices to get there (i.e., 3 hops instead of 1). The same is true when Device B is talking to Device A, which takes the same 3-hop path, just in reverse. Due to limitations in a ZigBee routing table, in a dense network with a lot of nodes, standard ZigBee routing may force a message to traverse an indirect path with a lot of hops, while a more direct path with fewer hops would have sufficed. The mesh topology provides inherent tolerance to broken links, at the expense of bandwidth, as the number of packets (request and response) increase proportionally to the number of hops along a single path. Given the complexity of a system that may be adopted, this may be infeasible in applications with higher throughput demands.

Embodiments provide systems and methods such that direct links (favored for routing) from a network concentrator can be found and maintained sustainably, while retaining the underlying repair mechanism of a wireless mesh network. Embodiments accomplish this by defining routes using a prioritized star network for specifically optimized one-hop routing to destination and/or intermediate nodes, then bridging down into the standard AODV multi-hop network to reach all remaining nodes if need be. Embodiments thus provide for routing of packets in a dense network that is more efficient, and uses less bandwidth for any given packet. This allows more packets to be sent per second, increasing the responsiveness of a ZigBee-based system and allowing more information to flow through the network. Embodiments provide optimized source routing that determines if a more direct route is available, and employs that route by overriding the standard ZigBee Source Route. Such embodiments for optimized routing in localized dense networks are particularly applicable to networks used for advanced systems, such as but not limited to advanced building automation system, advanced energy management systems, and advanced lighting systems. For example, in an advanced lighting system, each node may be either a lighting device or a sensor, and is equipped with a radio for communication with other nodes of the network.

Some embodiments disclosed herein include software programs to perform the method embodiment steps and operations summarized above and disclosed in detail below. More particularly, some embodiments includes a computer program product that has a non-transitory computer-readable medium including computer program logic encoded thereon, that when performed in a computerized device such as a processor, provides associated operations to optimize routing in localized dense networks as explained herein. The computer program logic, when executed on at least one processor with a computing system, causes the processor to perform the operations (e.g., the methods) indicated herein. Such embodiments are typically provided as software, code, and/or other data structures arranged or encoded on a computer readable medium such as but not limited to an optical medium (e.g., CD-ROM, DVD-ROM, Blu-Ray), hard disk, solid state memory, or on another medium, such as but not limited to firmware or microcode in one or more ROM or RAM or PROM chips, or as an Application Specific Integrated Circuit (AMC) or as downloadable software images in one or more modules, shared libraries, etc. The software or firmware or other such configurations may be installed onto a computerized device to cause one or more processors in the computerized device to perform the techniques explained herein. Software processes that operate in a collection of computerized devices, such as in a group of data communications devices or other entities, are also included. Embodiments may be distributed between many software processes on several data communications devices, or all processes could run on a small set of dedicated computers or processor, or on one computer or processor alone.

In an embodiment, there is provided a method. The method includes: receiving a packet at a first network device in a network; determining an optimal route for the packet to a neighbor network device in the network using a Source Routing Table (SRT), wherein the SRT includes an optimized routing table and a standard routing table; and routing the packet to the neighbor network device using the optimal route.

In a related embodiment, determining may include: determining an optimal route for the packet to a neighbor network device in the network using a Source Routing Table (SRT), wherein the SRT includes an optimized routing table and a standard routing table, wherein the optimized routing table comprises a list of neighbor network devices that the first network device can route to directly, and wherein the standard routing table comprises a ZigBee source routing table.

In another related embodiment, the method may further include maintaining the SRT.

In a further related embodiment, maintaining the SRT may include: determining whether a route in the SRT is one-hop optimized; when the route is determined not to be one-hop optimized, sending a test packet directly to the neighbor network device with no intermediary hops using a one-hop optimized route; when sending a test packet fails, canceling a maintaining process for the route; and when sending a test packet succeeds, resending the test packet directly to the neighbor network device with no intermediary hops a predetermined number of times at predetermined intervals, such that if the resending is successful each time, routing all future non-test packets to the neighbor network device using the one-hop optimized route.

In another further related embodiment, maintaining the SRT may include: determining whether a route in the SRT is one-hop optimized; when the route is determined to be one-hop optimized, sending a test packet directly to the neighbor network device with no intermediary hops; when sending a test packet succeeds, canceling a maintaining process for the route; and when sending a test packet is not successful, setting the route as not one-hop optimized and routing all future non-lest packets to the neighbor network device using the standard routing table of the SRT.

In yet another further related embodiment, maintaining the SRT may include: determining whether a route to or from a concentrator in the SRT is one-hop optimized; when the route is determined not to be one-hop optimized, determining whether the concentrator is in a neighbor table and whether a link quality of a link to the concentrator is good; when the concentrator is either not a neighbor table or a link quality is not good, repeating determining whether a route to or from a concentrator in the SRT is one-hop optimized after a predetermined time interval; when the concentrator is either in a neighbor table or a link quality is good, sending a test packet directly to the concentrator with no intermediary hops; when sending a test packet is not successful, canceling a maintaining process for the route; and when sending a test packet is successful, sending again a predetermined number of times, and if all are successful, setting the route as one-hop optimized and routing all future non-test packets to the concentrator using the one-hop optimized routing table of the SRT, In a further related embodiment, when the route is determined to be one-hop optimized, and a link quality is good, sending a predetermined number of test packets to or from the concentrator; when sending a test packet succeeds, canceling a maintaining process for the route; when sending a test packet is not successful, then setting the route as not one-hop optimized and routing all future non-test packets to or from the concentrator using the standard routing table of the SRT; and when the route is determined to be one-hop optimized and a link quality is not good, then repeating determining whether a route to or from a concentrator in the SRT is one-hop optimized after a predetermined time interval.

In another embodiment, there is provided a computer program product, stored on a non-transitory computer readable medium, including instructions of optimized routing in localized dense networks that, when executed on a processor in communication with the non-transitory computer readable medium, cause the processor to perform operations of: receiving a packet at a first network device in a network; determining an optimal route for the packet to a neighbor network device in the network using a Source Routing Table (SRT) wherein the SRT includes an optimized routing table and a standard routing table; and routing the packet using the optimal route.

In a related embodiment, the instructions may cause the processor to perform further operations of: determining an optimal route for the packet to a neighbor network device in the network using a Source Routing Table (SRT), wherein the SRT includes an optimized routing table and a standard routing table, wherein the optimized routing table comprises a list of neighbor network devices that the first network device can route to directly, and wherein the standard routing table comprises a ZigBee source routing table.

In another related embodiment, the instructions may cause the processor to perform further operations of maintaining the SRT.

In a further related embodiment, the instructions for maintaining the SRI may cause the processor to perform further operations of; determining whether a route in the SRT is one-hop optimized; when the route is determined not to be one-hop optimized, sending a test packet directly to the neighbor network device with no intermediary hops using a one-hop optimized route; when sending a test packet fails, canceling a maintaining process for the route; and when sending a test packet is successful, resending the test packet directly to the neighbor network device with no intermediary hops a predetermined number of times at predetermined intervals, such that if the resending is successful each time, routing all future non-test packets to the neighbor network device using the one-hop optimized route.

In another further related embodiment, the instructions for maintaining the SRT may cause the processor to perform further operations of: determining whether a route in the SRT is one-hop optimized; when the route is determined to be one-hop optimized, sending a test packet directly to the neighbor network device with no intermediary hops; when sending test packet succeeds, canceling a maintaining process for the route; and when sending a test packet is not successful, setting the route as not one-hop optimized and routing all future non-test packets to the neighbor network device using the standard routing table of the SRT.

In still another further related embodiment, the instructions for maintaining the SRT may cause the processor to perform further operations of: determining whether a route to or from a concentrator in the SRT is one-hop optimized; when the route is determined not to be one-hop optimized, determining whether the concentrator is in a neighbor table and whether a link quality of a link to the concentrator is good; when the concentrator is either not in a neighbor table or a link quality is not good, repeating determining whether a route to or from a concentrator in the SRT is one-hop optimized after a predetermined time interval; when the concentrator is either in a neighbor table or a link quality is good, sending a test packet directly to the concentrator with no intermediary hops; when sending a test packet is not successful, canceling a maintaining process for the route; and when sending a test packet is successful, sending again a predetermined number of times, and if all are successful, setting the route as one-hop optimized and routing all future non-test packets to the concentrator using the one-hop optimized routing table of the SRT. In a further related embodiment, the instructions may cause the processor to perform further operations of: when the route is determined to be one-hop optimized, and wherein a link quality is good, sending a predetermined number of test packets to or from the concentrator; when sending a test packet succeeds, canceling a maintaining process for the route; when sending a test packet is not successful, then setting the route as not one-hop optimized and routing all future non-test packets to or from the concentrator using the standard routing table of the SRT; and when the route is determined to be one-hop optimized and a link quality is not good, then repeating determining whether a route to or from a concentrator in the SRT is one-hop optimized after a predetermined time interval.

In another embodiment, there is provided a network device. The network device includes: a memory; a processor; a communications interface; and an interconnection mechanism coupling the memory, the processor, and the communications interface; wherein the memory is encoded with an application to optimize routing in localized dense networks, that when performed on the processor, provides a process to optimize routing in localized dense networks, the process causing the network device to perform operations of: receiving a packet at a first network device in a network; determining an optimal route for the packet to a neighbor network device in the network using a Source Routing Table (SRT) wherein the SRT includes an optimized routing table and a standard routing table; and routing the packet to the neighbor network device using the optimal route.

In a related embodiment, the optimized routing table may include a list of neighbor network devices that the first network device can route to directly, and the standard routing table may include a ZigBee source routing table.

In another related embodiment, the network device may further include operations of maintaining the SRT. In a further related embodiment, maintaining the SRT may include: determining whether a route in the SRT is one-hop optimized; when the route is determined not to be one-hop optimized, sending, a test packet directly to the neighbor network device with no intermediary hops using a one-hop optimized route; when sending a test packet fails, canceling a maintaining process for the route; and when sending a test packet is successful₁ resending the test packet directly to the neighbor network device with no intermediary hops a predetermined number of times at predetermined intervals, such that if the resending is successful each time, routing all future non-test packets to the neighbor network device using the one-hop optimized route.

In another further related embodiment, maintaining the SRT may include: determining whether a route in the SRT is one-hop optimized; when the route is determined to be one-hop optimized, sending a test packet directly to the neighbor network device with no intermediary hops; when sending a test packet succeeds, canceling a maintaining process for the route; and when sending a test packet is not successful, setting the route as not one-hop optimized and routing all future non-test packets to the neighbor network device using the standard routing table of the SRT.

In yet another further related embodiment, maintaining the SRT may include: determining whether a route to or from a concentrator in the SRT is one-hop optimized; when the route is determined not to be one-hop optimized, determining, whether the concentrator is in a neighbor table and whether a link quality of a link to the concentrator is good; when the concentrator is either not in a neighbor table or a link quality is not good, repeating determining whether a route to or from a concentrator in the SRT is one-hop optimized after a predetermined time interval; when the concentrator is either in a neighbor table or a link quality is good, sending a test packet directly to the concentrator with no intermediary hops; when sending a test packet is not successful, canceling a maintaining process for the route; and when sending a test packet is successful, sending again a predetermined number of times, and if all are successful, setting the route as one-hop optimized and routing all future non-test packets to the concentrator using the one-hop optimized routing table of the SRT. In a further related embodiment, the network device may further include operations of: when the route is determined to be one-hop optimized, and wherein a link quality is good, sending a predetermined number of test packets to or from the concentrator; when sending a test packet succeeds, canceling a maintaining process for the route; when sending a test packet is not successful, then setting the route as not one-hop optimized and routing all future non-test packets to or from the concentrator using the standard routing table of the SRT; and when the route is determined to be one-hop optimized and a link quality is not good, then repeating determining whether a route to or from a concentrator in the SRT is one-hop optimized after a predetermined time interval.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
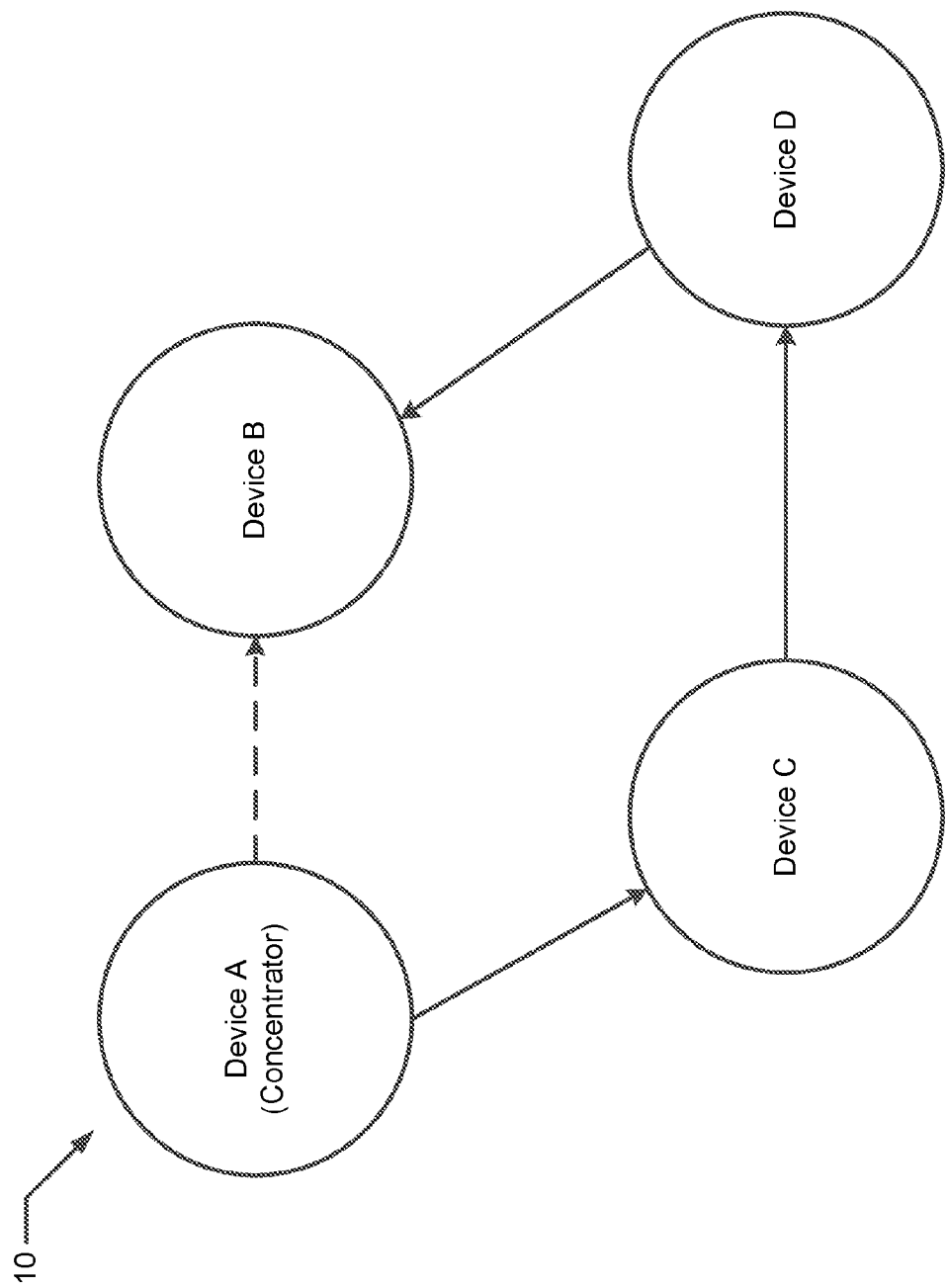
FIG. 1 depicts a block diagram of a prior art environment for optimized routing in localized dense networks.

FIG. 1 shows a first environment 10. Device A is a concentrator. The solid line shows the path taken by a packet from Device A to Device B. The path includes multiple hops, a first hop from Device A to Device C, a second hop from Device C to Device D, and a third hop from Device D to Device B. This wastes bandwidth and adds delay. This occurs when the network is dense and the standard ZigBee neighbor tables of Device A and/or Device B are full and therefore there is not a one-hop path available in the standard ZigBee Source Routing Table from Device A to Device B. The dotted line shows the desired direct path from Device A to Device B.

Figure 2:
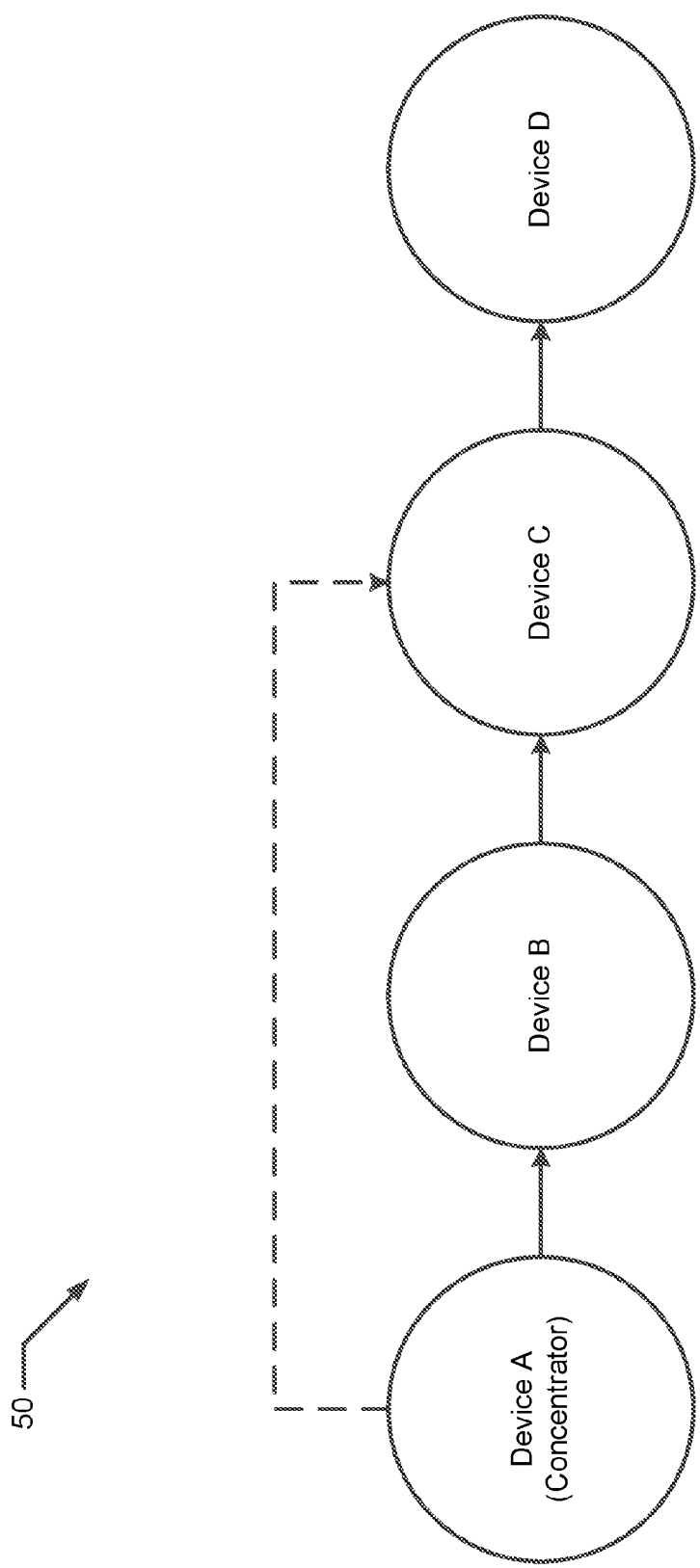
FIG. 2 depicts a block diagram of an environment for optimized routing in localized dense networks according to embodiments disclosed herein.

Embodiments include keeping track of incoming route information from devices (via Route Record packets and by routes taken by test packets), and maintaining a device's own Source Routing Table (as opposed to the standard ZigBee Source Routing Table provided by the ZigBee stack). This device-specific Source Routing Table contains both optimized source routes and standard ZigBee source routes, in case an optimized route is not available or as a fallback in case an optimized route stopped working. Some embodiments use different ways to determine if a more optimized route is available. For example, in some embodiments, the neighbor table is periodically updated and it only contains devices that are within radio range. By periodically scanning this table and maintaining a table of devices that have existed (or currently exist) in the neighbor table, a device may get an idea of other devices that may be reached directly. In some embodiments, a trial and error methodology is used. A test packet is sent by a device using a path that it believes could be more optimal. If it succeeds then it knows that the optimized path may be used. If it fails, then it either tries a different route, or gives up and accepts that for that particular node, a more optimized path doesn't exist. Also, it may further improve this by leveraging the fact that all source routes essentially form a tree, and that if an optimized route is found for a node that is an intermediary node of another route, then the optimized route may be used for that other route as well. For example, FIG. 2 show a network environment 50 including Device A, which is the concentrator, Device B, Device C, and Device D. Device A is connected to Device B, which is connected to Device C, which is connected to Device D. In the network environment 50 if it is discovered that Device A is able to communicate to Device C directly (as opposed to routing through Device B), then a packet to Device D may also be sent by bypassing Device B. Using standard ZigBee source routing, the path from A to C would have been A→B→C and the path from A to D would have been A→B→C→D. With optimized source rowing according to embodiments disclosed throughout, the path from. A to C would instead be A→C and the path from A to D would instead be A→C→D. Thus, optimizing one of these routes may automatically optimize another route, because they share the same base path. These approaches, in some embodiments, are applied separately, and in some embodiments, are applied together to increase the likelihood of success and increase the reliability of the optimized network.

In a wireless system, a route that previously worked may stop working, and a route that did not work previously may work in the future. This is because the quality of a link between two nodes is determined by many factors, many of which are constantly changing. For this reason, even standard ZigBee routing is quite dynamic and often has to be updated periodically to maintain a reliable network. With optimized routing, this is also true. Routes that previously failed need to be tried again in case they start working, and existing optimized routes should be re-validated to ensure they still work. Overriding the standard ZigBee source route is a relatively straightforward process because the entire source route is contained in the "ZigBee Network" portion of the packet. The packet will then be forwarded along the specified path without any further intervention needed.

In some embodiments, such as those used to source route, from the concentrator to a node, the following methodology is used. In a round robin format, the concentrator continuously performs an optimization attempt process on all known routers in a network. The optimization attempt process for each router starts by checking to see if the route in the source route table is set to be one-hop optimized (i.e., it is currently communicating directly to the router), If the route is not one-hop optimized, the concentrator tries sending a test packet (which is considered acceptable to lose) directly to the router with no intermediary hops (one-hop source routed). If the test packet fails (i.e., the Lest packet is not received by router, for example there is no APS ack and/or MAC ack received from the router, or the number of MAC retries is greater than or equal to some threshold, such as but not limited to seven), nothing is done and the optimization attempt process is cancelled. One-hop optimized routing to that router is then immediately disabled. If the test packet succeeds (i.e., the test packet is received by the router, for example there is an APS ack and/or MAC ack received from the router, or the number of MAC retries is less than the threshold), this is considered to be a successful attempt. When there are some number of consecutive successful attempts, such as two, three, four, five, six, and so on, and these are separated by at least a minimum time period, such as three minutes, four minutes, five minutes, six minutes, and so on, for that router, it is determined that the route to that router should be one-hop optimized and immediately all subsequent routing of non-test packets to-and-through the router are routed along the newly found path. Therefore, this automatically optimizes the route.

Referring again to FIG. 2, if communication from Device A to Device C is not using a one-hop optimized route, and Device A successfully sends three one-hop source routed test packets to Device C, then all future non-test packets from Device A to Device C will be sent directly (A→C) and all future non-test packets to Device D will be sent using the route A→C→D. Note that the newly optimized route automatically benefits all other mesh network devices down its path, be they end devices or other routers, as packets will take the initial one-hop route to the intermediate router before continuing on the path towards the destination. It should be appreciated that the example numbers used above (for example, seven MAC retries, three, four, five, or six attempts, and three, four, five, or six minutes) are only for a specific example and that any number of MAC retries, any number of attempts, and any number of minutes or seconds could be used.

If, at the start of the optimization attempt process, the route in the source route table is already set to be one-hop optimized, the concentrator instead uses the opportunity to validate the one-hop optimized route. If the one-hop source routed test packet succeeds (i.e., the packet is received by the router (APS ack and/or MAC ack received from the router) and the number of MAC retries is beyond the set threshold), nothing is done, but if it fails (i.e., no APS ack and/or MAC ack received from the router, or the number of MAC retries is beyond the set threshold), the route is set to not be one-hop optimized and all routing of non-test packets to this router will instead be reached via standard ZigBee source routing.

In some embodiments, such as used to source route from a router to a concentrator, the following methodology is used. The optimization attempt process is started by a router by checking to see if the route to the concentrator is set to be one-hop optimized. If it is not set to be one-hop optimized, it proceeds by checking to see if the concentrator is in its neighbor table and that the link quality is good. If it is not in the neighbor table or if the link quality is not good, then the route remains as not one-hop optimized and the optimization attempt process is restarted after some amount of time, such as but not limited to 15 minutes, 10 minutes, 20 minutes, 11 minutes, 16 minutes, 14 minutes, and so on.

If the concentrator is in the neighbor table of the router and its link quality is deemed good, then the router attempts to send one-hop source routed test packets to the concentrator (which are considered acceptable to lose). It sends a number of test packets, such as but not limited to 2, 3, 4, 5, and so on, spaced some amount of time apart, for example but not limited to 5 seconds, 4 seconds, 4.5 seconds, 6 seconds, 5.5 seconds, and so on. If at any point a test packet fails (i.e., the test packet is not received by the concentrator (no APS ack and/or MAC ack received from the concentrator)), the route to the concentrator remains as not one-hop optimized and the optimization attempt process is restarted after a period of time, such as but not limited to 15 minutes, 10 minutes, 20 minutes, 11 minutes, 16 minutes, 14 minutes, and so on. If all sent test packets succeed (all test packets are received by the concentrator (APS acknowledgements and/or MAC acknowledgments received from the concentrator for all test packets)), then the route to the concentrator is set as one-hop optimized. At that point in time, all non-test packets will be routed directly to the concentrator without any intermediary hops.

If, at the start of the optimization attempt process, the route to the concentrator is already set to be one-hop optimized, the route is re-tested by sending a test packet. If the test packet succeeds, the optimization attempt process is restarted after a period of time. If the test packet fails, the route is set to not be one-hop optimized. All non-test packets to the concentrator will be routed using standard ZigBee routing at that point in time, and the optimization attempt process is restarted after a period of time. In addition to the optimization attempt process, if ever the link quality for the concentrator in the neighbor table changes from good to bad, or if ever the concentrator disappears from a non-full neighbor table (indicating it is no longer in wireless range), the route is also set to not be one-hop optimized. Although the above process is applied to the route to the concentrator, it may just as easily be applied to any other node on the ZigBee network.

In some embodiments, the network is defined to be less dense (i.e., more sparse). In a ZigBee network, devices may be divided into either routers or end devices. Usually routers are line-powered devices, because routing is an energy-taxing service as a device always needs to be listening and often transmitting messages throughout the network. Usually end devices are called sleepy end devices, and they are usually battery powered devices that do not take part in the routing of messages to other devices. End devices need to have a router as a parent. The router parent stores messages for the device while it is sleeping, and acts as a proxy towards the ZigBee network. It is, however, possible to be a non-sleepy end device, which is a line-powered device that does not actively take part in the routing of messages throughout the network. Some of the routers are decreed to be non-sleepy end devices, and then they will not be seen in the neighbor tables of routers, nor actively participate in the routing of packets. When forming the source routes to and from the concentrator then, there are a fewer number of routers, and hence the neighbor tables of routers are not constantly overflowing. This allows a more direct and efficient path to be to be used when devices are communicating to/from the concentrator.

There are a variety of ways to select which routers to decree as end devices. For example, routers may be randomly picked, however this may alienate a certain portion of the network because there are no more routers in that region. Also, when a device is an end device, it needs to be in the parent table of a router. This could lead to a situation in a portion of the network where there are too many end devices to be contained in the child tables of routers nearby. Such child tables could then be expanded.

Figure 3A:
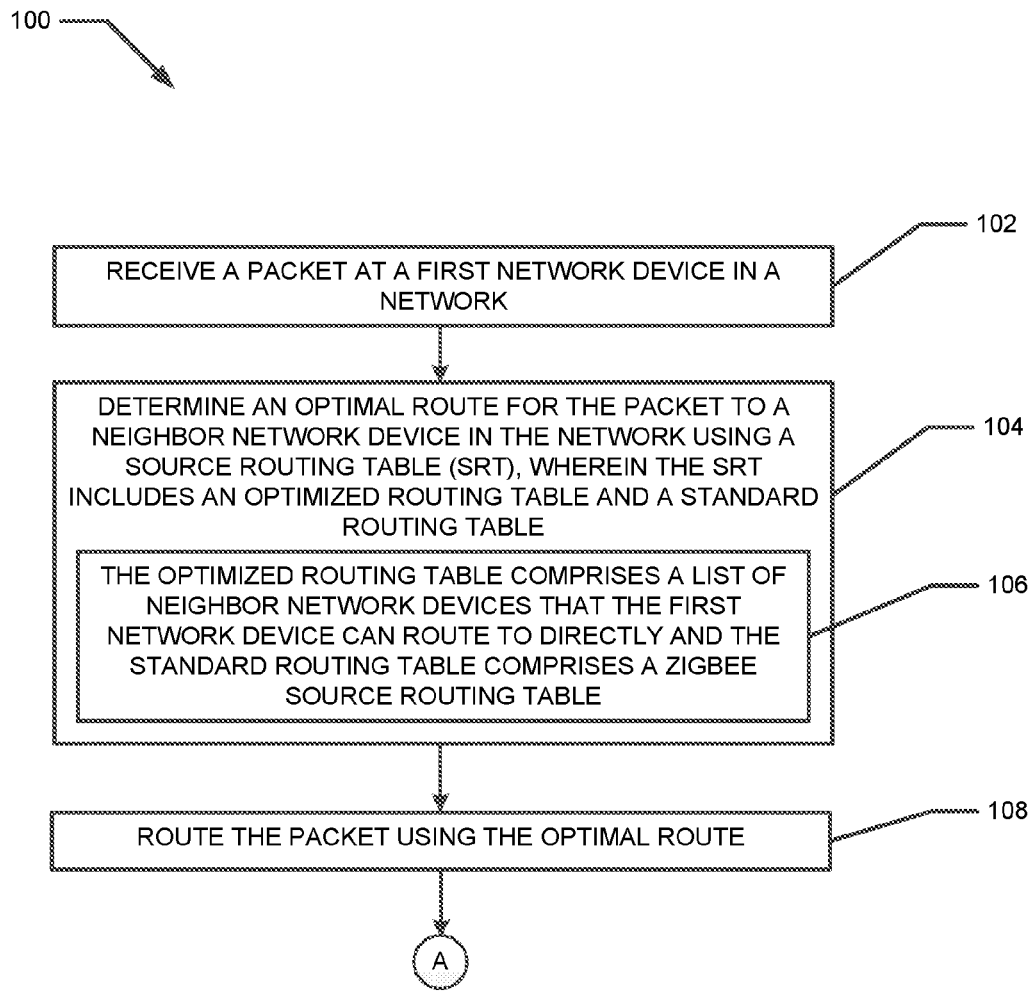
FIGS. 3A-3C depict a flow diagram of a method of optimizing routing in localized dense networks according to embodiments disclosed herein.
Figure 3B:
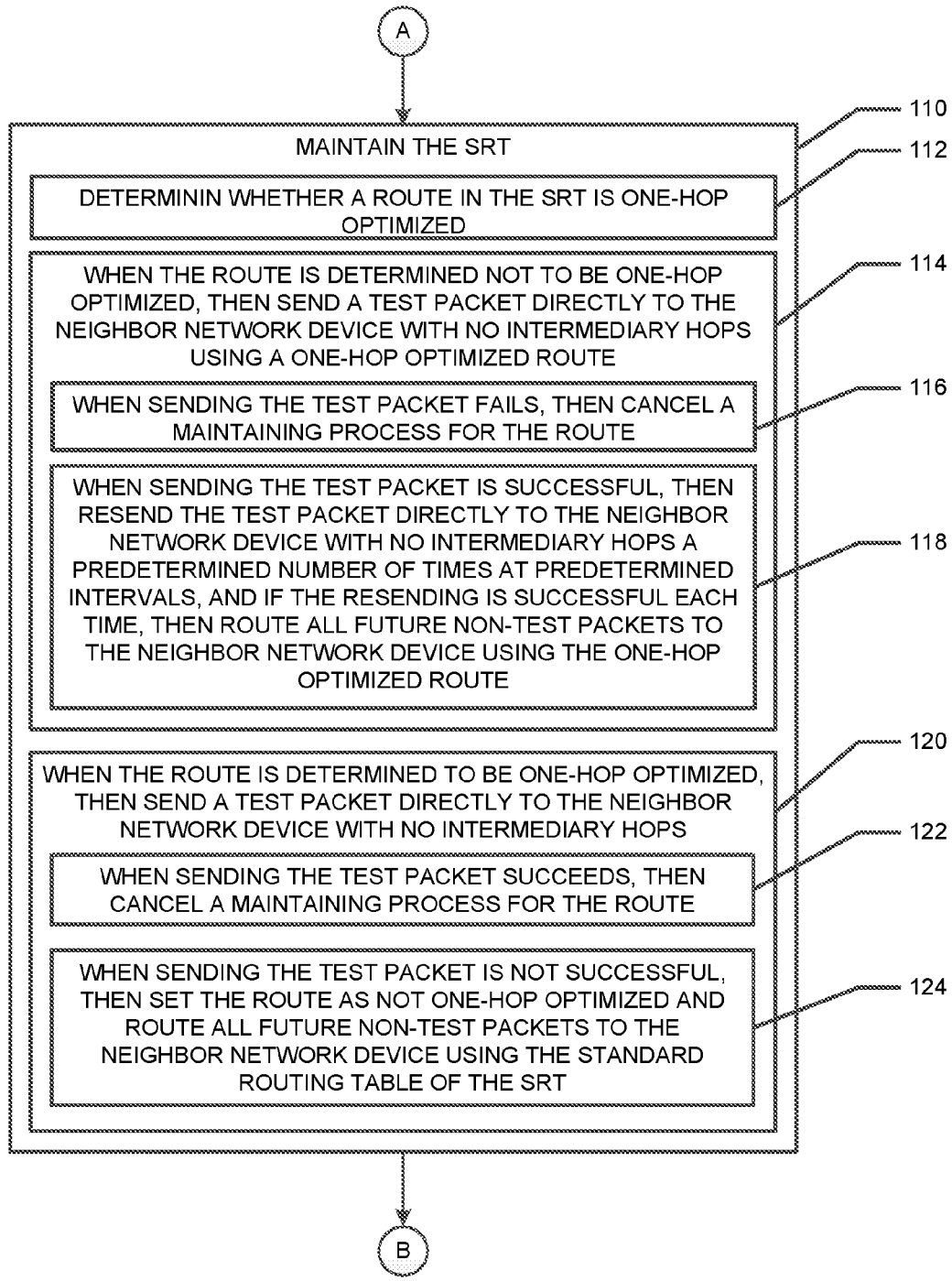
Figure 3C:
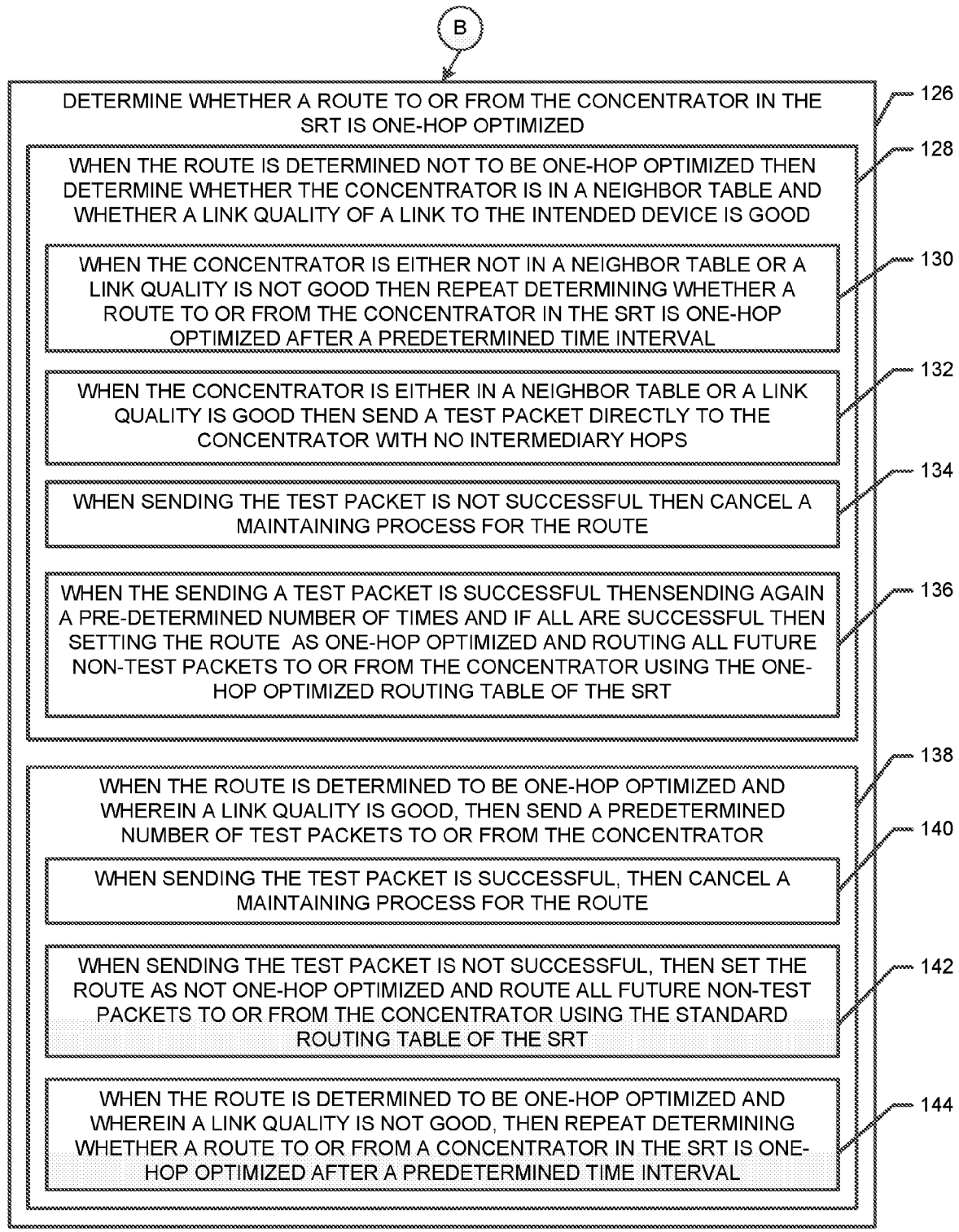

A flow diagram of a method 100 is depicted in FIGS. 3A-3C. The rectangular elements are herein denoted "processing blocks" and represent computer software instructions or groups of instructions. Alternatively, the processing blocks represent steps performed by functionally equivalent circuits, such as a digital signal processor circuit or an application specific integrated circuit (ASIC).

The flow diagrams of FIGS. 3A-3C do not depict the syntax of any particular programming language. Rather, the flow diagrams illustrate the functional information one of ordinary skill in the art requires to fabricate circuits or to generate computer software to perform the processing required in accordance with the present invention. It should be noted that many routine programs elements, such as initialization of loops and variables, and the use of temporary variables, are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered meaning that, when possible, the steps may be performed in any convenient or desirable order.

Further, while FIGS. 3A-3C illustrate various operations, it is to be understood that not all of the operations depicted in FIGS. 3A-3C are necessary for other embodiments to function. Indeed, it is fully contemplated herein that in other embodiments, the operations depicted in FIGS. 3A-3C, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

The method 100 begins in FIG. 3A with a processing block 102, a packet is received at a first network device in a network. In a processing block 104, an optimal route for the packet to a neighbor network device in the network is determined using a Source Routing Table (SRT), wherein the SRT includes an optimized routing table and a standard routing table. As shown in a processing block 106, in some embodiments, the optimized routing table comprises a list of neighbor network devices that the first network device can route to directly, and the standard routing table comprises a ZigBee source routing table. Next, in a processing block 108, the packet is routed using the optimal route. The optimal route, in some embodiments, is the route from the optimized routing table, and in some embodiments, is a route from the ZigBee source routing table.

Processing continues in FIG. 3B with a processing block 110, where the SRT is maintained. In some embodiments, as shown in a processing block 112, the SRT is maintained by determining whether a route in the SRT is one-hop optimized. In some embodiments, as shown in a processing block 114, when the route is determined not to be one-hop optimized, then a test packet is sent directly to the neighbor network device with no intermediary hops using a one-hop optimized route. Then, in a processing block 116, when sending the test packet falls, a maintaining process for the route is canceled. In a processing block 118, when sending the test packet is successful, then the test packet is resent directly to the neighbor network device with no intermediary hops a predetermined number of times at predetermined intervals, and if the resending is successful each time, then all future non-test packets are routed to the neighbor network device using the one-hop optimized route.

In some embodiments, as shown in a processing block 120, when the route is determined to be one-hop optimized, a test packet is sent directly to the neighbor network device with no intermediary hops. In a processing block 122, when sending a test packet succeeds, then a maintaining process for the route is canceled. In a processing block 124, when sending a test packet is not successful, then the route is set as not one-hop optimized and all future non-test packets are routed to the neighbor network device using the standard routing table of the SRT.

Processing continues in FIG. 3C with a processing block 126, where whether a route to or from a concentrator in the SRT is one-hop optimized is determined. In a processing block 128, when the mute is determined not to be one-hop optimized, then it is determined whether the concentrator is in a neighbor table and whether a link quality of a link to the intended device is good. In some embodiments, as shown in a processing block 130, when the concentrator is either not in a neighbor table or a link quality is not good, then determining whether a route to or from the concentrator in the SRT is one-hop optimized is repeated after a predetermined time interval. In a processing block 132, when the concentrator is either in a neighbor table or a link quality is good, then a test packet is sent directly to the concentrator with no intermediary hops. In a processing block 134, when sending the test packet succeeds, then a maintaining process for the route is canceled. In a processing block 136, when sending the test packet is not successful, then the route is set as not one-hop optimized and all future non-test packets are routed to the concentrator using the standard routing table of the SRT.

In some embodiments, as shown in a processing block 138, when the route is determined to be one-hop optimized and wherein a link quality is good, then a predetermined number of test packets are sent to or from the concentrator. In a processing block 140, when sending the test packet is successful, then a maintaining process for the route is canceled. In a processing block 142, when sending the test packet is not successful, then the route is set as not one-hop optimized and all future non-test packets are routed to or from the concentrator using the standard routing table of the SRT. In a processing block 144, when the route is determined to be one-hop optimized and wherein a link quality is not good, then determining whether a route to or from a concentrator in the SRT is one-hop optimized is repeated after a predetermined time interval.

Figure 4:
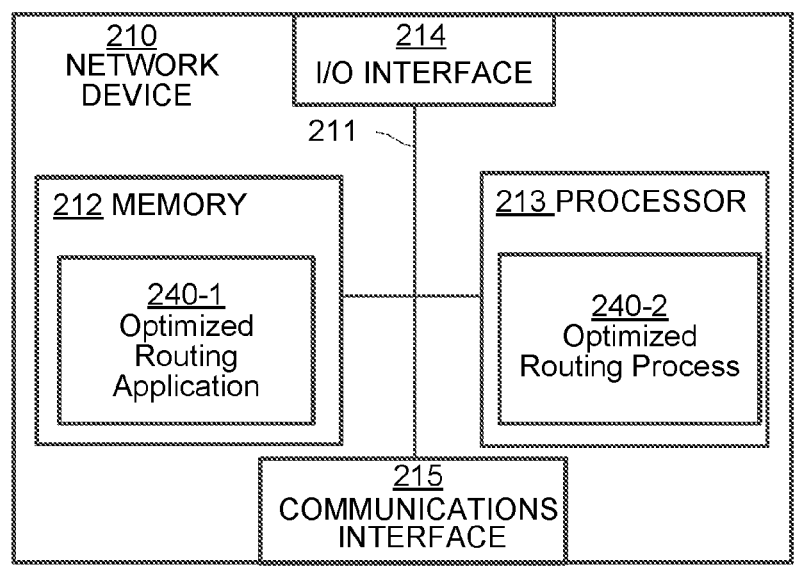
FIG. 4 depicts a block diagram of a network device according to embodiments disclosed herein.

Referring now to FIG. 4, a block diagram 200 illustrates an example architecture of a network device 210 that executes, runs, interprets, operates, or otherwise performs an optimized routing application 240-1 and an optimized routing process 240-2 suitable for use in explaining example configurations disclosed herein. As shown in FIG. 4, the network device 210 includes an interconnection mechanism 211, such as but not limited to a data bus or other circuitry that couples a memory 212, a processor 213, an input/output interface 214, and a communications interface 215. In some embodiments, the input/output interface 214 is optional. The communications interface 215 enables the network device 210 to communicate with other devices (i.e., other network devices) on a network (not shown).

The memory 212 is any type of computer readable medium, and in this example, is encoded with an optimized routing application 240-1 as explained herein. Tue optimized routing application 240-1 may be embodied as software code such as data and/or logic instructions (e.g., code stored in the memory or on another computer readable medium such as a removable disk) that supports processing functionality according to different embodiments described herein. During operation of the network device 210, the processor 213 accesses the memory 212 via the interconnection mechanism 211 in order to launch, run, execute, interpret, or otherwise perform the logic instructions of the optimized routing application 240-1. Execution of the optimized routing application 240-1 in this manner produces processing functionality in the optimized routing process 240-2. In other words, the optimized routing process 240-2 represents one or more portions or runtime instances of an optimized routing application 240-1 (or the entire optimized routing application 240-1) performing or executing within or upon the processor 213 in the network device 210 at runtime.

It is noted that example configurations disclosed herein include the optimized routing application 240-1 itself (i.e., in the form of un-executed or non-performing logic instructions and/or data). The optimized routing application 240-1 may be, and in some embodiments is, stored on a computer readable medium such as a disk, hard drive, electronic, magnetic, optical, or other computer readable medium. The optimized routing application 240-1 may also be, and in some embodiments is, stored in a memory 212, such as in firmware, read only memory (ROM), or as executable code in, for example, Random Access Memory (RAM). In addition to these embodiments, it should also be noted that other embodiments herein include the execution of the optimized routing application 240-1 in the processor 213 as the optimized routing process 240-2. Those skilled in the art will understand that the network device 210 may include other processes and/or software and hardware components, such as an operating system that controls allocation and use of hardware resources associated with the network device 210, not shown in this example.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, flash memory, solid state drive, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), personal area network (PAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), tablet(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
receiving a packet at a first network device in a network;
determining an optimal route for the packet to a neighbor network device in the network using a Source Routing Table (SRT), wherein the SRT includes an optimized routing table and a standard routing table;
routing the packet to the neighbor network device using the optimal route; and
maintaining the SRT, wherein maintaining the SRT comprises:
    determining whether a route in the SRT is one-hop optimized; and
    in response to determining the route to be one-hop optimized or not to be one-hop optimized, sending a test packet directly to the neighbor network device with no intermediary hops,
    wherein maintaining the SRT further comprises:
        when the route is determined not to be one-hop optimized, sending the test packet directly to the neighbor network device with no intermediary hops using a one-hop optimized route,
        when sending the test packet fails, canceling a maintaining process for the route, and
        when sending the test packet succeeds, resending the test packet directly to the neighbor network device with no intermediary hops a predetermined number of times at predetermined intervals, such that if the resending is successful each time, routing all future non-test packets to the neighbor network device using the one-hop optimized route.

2. The method of claim 1, wherein determining the optimal route for the packet comprises:
determining the optimal route for the packet using the SRT including i) the optimized routing table that comprises a list of neighbor network devices that the first network device can route to directly and ii) the standard routing table that comprises a ZigBee source routing table.

3. The method of claim 1, wherein maintaining the SRT further comprises:
when the route is determined to be one-hop optimized, sending the test packet directly to the neighbor network device with no intermediary hops without using a one-hop optimized route;
when sending the test packet succeeds, canceling a maintaining process for the route; and
when sending the test packet fails, setting the route as not one-hop optimized and routing all future non-test packets to the neighbor network device using the standard routing table of the SRT.

4. The method of claim 1, wherein the route is a route to or from a concentrator in the SRT, and wherein maintaining the SRT further comprises:
when the route to or from the concentrator in the SRT is determined not to be one-hop optimized, determining whether the concentrator is in a neighbor table and whether a link quality of a link to the concentrator is good;
when either i) the concentrator is not in the neighbor table or ii) the link quality is not good, repeating determining whether the route to or from the concentrator in the SRT is one-hop optimized after a predetermined time interval;
when either i) the concentrator is in a neighbor table or ii) the link quality is good, sending a test packet directly to the concentrator with no intermediary hops;
when sending the test packet fails, canceling a maintaining process for the route; and
when sending the test packet is successful, sending again a predetermined number of times, and if all are successful, setting the route as one-hop optimized and routing all future non-test packets to the concentrator using the one-hop optimized routing table of the SRT.

5. The method of claim 1, wherein the route is a route to or from a concentrator in the SRT, and wherein maintaining the SRT further comprises:
when the route to or from the concentrator in the SRT is determined to be one-hop optimized and a link quality of a link to the concentrator is determined to be good, sending a predetermined number of test packets to or from the concentrator;
when sending the test packet succeeds, canceling a maintaining process for the route;
when sending the test packet fails, setting the route as not one-hop optimized and routing all future non-test packets to or from the concentrator using the standard routing table of the SRT; and
when the route to or from the concentrator in the SRT is determined to be one-hop optimized and the link quality is determined to be not good, repeating determining whether the route to or from the concentrator in the SRT is one-hop optimized after a predetermined time interval.

6. A computer program product, stored on a non-transitory computer readable medium, including instructions of optimized routing in localized dense networks that, when executed on a processor in communication with the non-transitory computer readable medium, cause the processor to perform operations of:
receiving a packet at a first network device in a network;
determining an optimal route for the packet to a neighbor network device in the network using a Source Routing Table (SRT), wherein the SRT includes an optimized routing table and a standard routing table;
routing the packet to the neighbor network device using the optimal route; and
maintaining the SRT, wherein maintaining the SRT comprises:
    determining whether a route in the SRT is one-hop optimized; and
    in response to determining the route to be one-hop optimized or not to be one-hop optimized, sending a test packet directly to the neighbor network device with no intermediary hops,
    wherein maintaining the SRT further comprises:
        when the route is determined not to be one-hop optimized, sending the test packet directly to the neighbor network device with no intermediary hops using a one-hop optimized route,
        when sending the test packet fails, canceling a maintaining process for the route, and
        when sending the test packet succeeds, resending the test packet directly to the neighbor network device with no intermediary hops a predetermined number of times at predetermined intervals, such that if the resending is successful each time, routing all future non-test packets to the neighbor network device using the one-hop optimized route.

7. The computer program product of claim 6, wherein the instructions cause the processor to perform further operations of:
determining the optimal route for the packet using the SRT including i) the optimized routing table that comprises a list of neighbor network devices that the first network device can route to directly and ii) the standard routing table that comprises a ZigBee source routing table.

8. The computer program product of claim 6, wherein the instructions for maintaining the SRT cause the processor to perform further operations of:
when the route is determined to be one-hop optimized, sending the test packet directly to the neighbor network device with no intermediary hops without using a one-hop optimized route;
when sending the test packet succeeds, canceling a maintaining process for the route; and
when sending the test packet fails, setting the route as not one-hop optimized and routing all future non-test packets to the neighbor network device using the standard routing table of the SRT.

9. The computer program product of claim 6,
wherein the route is a route to or from a concentrator in the SRT, and
wherein the instructions for maintaining the SRT cause the processor to perform further operations of:
when the route to or from the concentrator in the SRT is determined not to be one-hop optimized, determining whether the concentrator is in a neighbor table and whether a link quality of a link to the concentrator is good;
when either i) the concentrator is not in the neighbor table or ii) the link quality is not good, repeating determining whether the route to or from the concentrator in the SRT is one-hop optimized after a predetermined time interval;
when either i) the concentrator is in a neighbor table or ii) the link quality is good, sending a test packet directly to the concentrator with no intermediary hops;
when sending the test packet fails, canceling a maintaining process for the route; and
when sending the test packet is successful, sending again a predetermined number of times, and if all are successful, setting the route as one-hop optimized and routing all future non-test packets to the concentrator using the one-hop optimized routing table of the SRT.

10. The computer program product of claim 6,
wherein the route is a route to or from a concentrator in the SRT, and
wherein the instructions for maintaining the SRT cause the processor to perform further operations of:
when the route to or from the concentrator in the SRT is determined to be one-hop optimized and a link quality of a link to the concentrator is determined to be good, sending a predetermined number of test packets to or from the concentrator;
when sending the test packet succeeds, canceling a maintaining process for the route;
when sending the test packet fails, setting the route as not one-hop optimized and routing all future non-test packets to or from the concentrator using the standard routing table of the SRT; and
when the route to or from the concentrator in the SRT is determined to be one-hop optimized and the link quality is determined to be not good, repeating determining whether the route to or from the concentrator in the SRT is one-hop optimized after a predetermined time interval.

11. A network device comprising:
a memory;
a processor;
a communications interface; and
an interconnection mechanism coupling the memory, the processor, and the communications interface;
wherein the memory is encoded with an application to optimize routing in localized dense networks, that when performed on the processor, provides a process to optimize routing in localized dense networks, the process causing the network device to perform operations of:
receiving a packet at a first network device in a network;
determining an optimal route for the packet to a neighbor network device in the network using a Source Routing Table (SRT), wherein the SRT includes an optimized routing table and a standard routing table;
routing the packet to the neighbor network device using the optimal route; and
maintaining the SRT, wherein maintaining the SRT comprises:
determining whether a route in the SRT is one-hop optimized; and
in response to determining the route to be one-hop optimized or not to be one-hop optimized, sending a test packet directly to the neighbor network device with no intermediary hops,
wherein maintaining the SRT further comprises:
when the route is determined not to be one-hop optimized, sending the test packet directly to the neighbor network device with no intermediary hops using a one-hop optimized route,
when sending the test packet fails, canceling a maintaining process for the route, and
when sending the test packet succeeds, resending the test packet directly to the neighbor network device with no intermediary hops a predetermined number of times at predetermined intervals, such that if the resending is successful each time, routing all future non-test packets to the neighbor network device using the one-hop optimized route.

12. The network device of claim 11, wherein the optimized routing table comprises a list of neighbor network devices that the first network device can route to directly, and wherein the standard routing table comprises a ZigBee source routing table.

13. The network device of claim 11, wherein maintaining the SRT further comprises:
when the route is determined to be one-hop optimized, sending the test packet directly to the neighbor network device with no intermediary hops without using a one-hop optimized route;
when sending the test packet succeeds, canceling a maintaining process for the route; and
when sending the test packet fails, setting the route as not one-hop optimized and routing all future non-test packets to the neighbor network device using the standard routing table of the SRT.

14. The network device of claim 11,
wherein the route is a route to or from a concentrator in the SRT, and
wherein maintaining the SRT further comprises:
when the route to or from the concentrator in the SRT is determined not to be one-hop optimized, determining whether the concentrator is in a neighbor table and whether a link quality of a link to the concentrator is good;
when either i) the concentrator is not in the neighbor table or ii) the link quality is not good, repeating determining whether the route to or from the concentrator in the SRT is one-hop optimized after a predetermined time interval;

when either i) the concentrator is in a neighbor table or ii) the link quality is good, sending a test packet directly to the concentrator with no intermediary hops;

when sending the test packet fails, canceling a maintaining process for the route;

and when sending the test packet is successful, sending again a predetermined number of times, and if all are successful, setting the route as one-hop optimized and routing all future non-test packets to the concentrator using the one-hop optimized routing table of the SRT.

15. The network device of claim 11, wherein the route is a route to or from a concentrator in the SRT, and wherein maintaining the SRT further comprises:

when the route to or from the concentrator in the SRT is determined to be one-hop optimized and a link quality of a link to the concentrator is determined to be good, sending a predetermined number of test packets to or from the concentrator; when sending the test packet succeeds, canceling a maintaining process for the route;

when sending the test packet fails, setting the route as not one-hop optimized and routing all future non-test packets to or from the concentrator using the standard routing table of the SRT; and when the route to or from the concentrator in the SRT is determined to be one-hop optimized and the link quality is determined to be not good, repeating determining whether the route to or from the concentrator in the SRT is one-hop optimized after a predetermined time interval.

* * * * *